W. QUINLAN.
Thill-Coupling.

No. 219,175. Patented Sept. 2, 1879.

Witnesses
Geo. H. Strong
Jno. L. Boone

Inventor
William Quinlan
by Dewey & Co.
Atty

UNITED STATES PATENT OFFICE.

WILLIAM QUINLAN, OF MAYFIELD, CALIFORNIA.

IMPROVEMENT IN THILL-COUPLINGS.

Specification forming part of Letters Patent No. 219,175, dated September 2, 1879; application filed January 27, 1877.

*To all whom it may concern:*

Be it known that I, WILLIAM QUINLAN, of Mayfied, county of Santa Clara, and State of California, have invented an Improved Thill-Coupling; and I do hereby declare the following to be a full, clear, and exact description thereof, reference being had to the accompanying drawings.

The object of my invention is to provide a cheap and durable thill-coupling for vehicles, by means of which the shafts can be easily and quickly connected and disconnected without the aid of a wrench.

Figure 1:
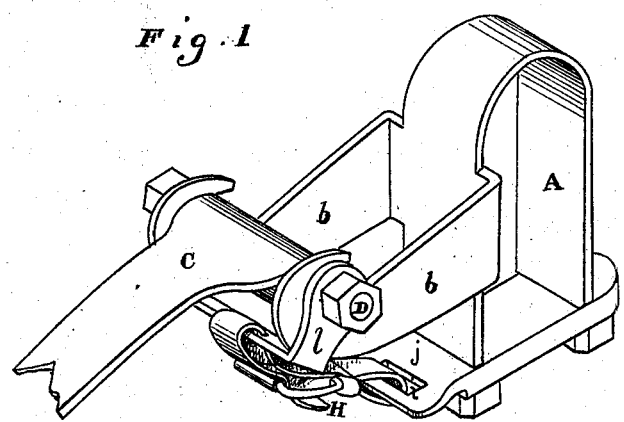
Figure 2:
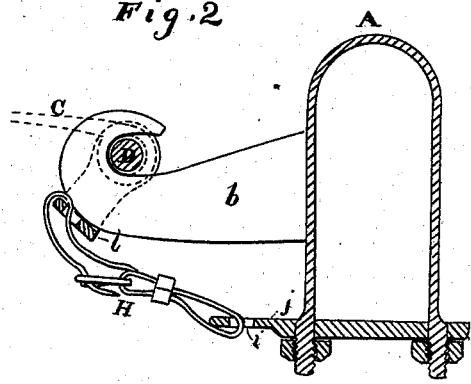

Referring to the accompanying drawings, Figure 1 is a perspective view of my coupling. Fig. 2 is a section of the same.

Let A represent one of the clips which secure the axle of a carriage, buggy, or other vehicle to the bolster, and to which the thill-attachment is made. Each of these clips I provide with two rigid tapering hook-arms, $b$ $b$, one of which projects outward horizontally from each side of the clip. The hooks which I form on the extremity of these arms turn upward and taper from the extremities of the hook-points to their points of connection with the clip, as represented.

C represents the rear end of the shaft or shaft-iron, through which a bolt or short shaft, D, passes transversely. This bolt or short shaft is long enough to enter the recesses of the hooks when the end of the shaft-iron is placed between the two arms $b$ $b$, so that it will serve as gudgeons or journals to support the shaft in the hook-bearings. This short shaft or bolt also passes through both ends of a bail, $l$, so that one end of the bail will be on the outside of each of the arms.

When the bolt or short shaft has been seated in the hook-bearings, I drop the bail down over the circular extremities of the hooks until it binds under the hooks on the eccentric which is formed by the gradual widening of the hook-arm. This draws the journals down firmly in the hook-bearings. I then fasten the bail in place by means of a buckle-strap, H, which connects it with an eye, $i$, on the cross-bar $j$ of the clip, so that the bail cannot lift or shift from its position, no matter in what direction the strain may come on the coupling.

To detach the shafts, I first loosen the strap H, so that the bail can be lifted over the end of the hook-arms. This frees the journals or bolts D, so that when the thills are turned upward the journals can be lifted out of the hook-bearings.

I thus provide a coupling that can be connected or disconnected without the aid of a wrench or other tool, and which will, therefore, be very convenient. It also possesses all the other qualities of a good substantial noiseless coupling, which is adapted for all classes of vehicles to which thills or a shaft are connected.

I am aware that heretofore a bail attached to the bolt in a shaft-iron and in connection with a rubber spring has been used in a thill-coupling. Hence I do not claim the bail and bolt, broadly, in combination in a thill-coupling; but,

Having thus described my invention, what I claim, and desire to secure by Letters Patent, is—

In a thill-coupling, the tapering hooks $b$ $b$, projecting from the clips A, and formed to receive the shaft or coupling-pin, as herein shown and described, in combination with the bail and the buckle-strap, whereby the shaft or coupling-pin is locked into the hooks and kept tight without other attachment, substantially as specified.

In witness whereof I have hereunto set my hand and seal.

WILLIAM QUINLAN. [L. S.]

Witnesses:
 GEO. H. STRONG,
 FRANK A. BROOKS.